C. C. BOGUE.
CAR WHEEL GRINDER OR PLANER.
APPLICATION FILED APR. 5, 1915.

1,197,435.

Patented Sept. 5, 1916.
2 SHEETS—SHEET 1.

WITNESSES:
Arthur L. Hedlund.
Ray H. Cowdin

INVENTOR
Charles C. Bogue.

C. C. BOGUE.
CAR WHEEL GRINDER OR PLANER.
APPLICATION FILED APR. 5, 1915.

1,197,435.

Patented Sept. 5, 1916.
2 SHEETS—SHEET 2.

WITNESSES:
Arthur L. Hedlund.
Ray H. Cowdin

INVENTOR
Charles C. Bogue

UNITED STATES PATENT OFFICE.

CHARLES C. BOGUE, OF HUGO, COLORADO.

CAR-WHEEL GRINDER OR PLANER.

1,197,435.   Specification of Letters Patent.   Patented Sept. 5, 1916.

Application filed April 5, 1915.   Serial No. 19,421.

*To all whom it may concern:*

Be it known that I, CHARLES C. BOGUE, a citizen of the United States, residing at Hugo, in the county of Lincoln and State of Colorado, have invented a new and useful Car-Wheel Grinder or Planer, of which the following is a specification.

My invention relates to the restoring of flattened car wheels by grinding the tread of the wheel on each side of the flat spot to such an extent that the spot is removed, and the wheel can remain in use, without having to remove the truck or the wheel from the car. The power for operating the machine is secured by attaching the same to the train air pipe, if the machine is equipped with an air motor, or by electricity from the train if the machine has an electric motor in it. The power can be either air or electric, and any make of motor will operate it. The whole operation requires but a few minutes' time, and can be done in the time it would take to set out a car and switch it onto the repair track. Thus it saves the delay to the car, as well as the value of a pair of wheels, as the wheels have just as long a life after grinding the flat spot out as they had before it occurred. I attain these objects by the mechanism illustrated in the accompanying drawings in which—

Figure 1:
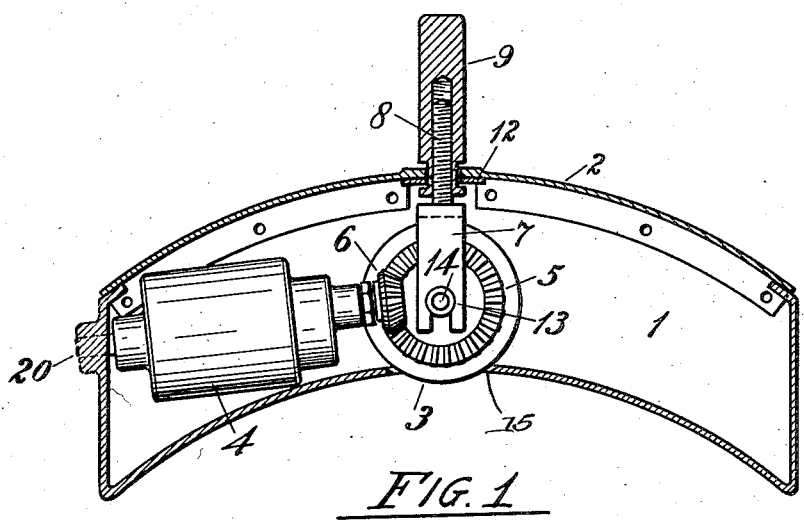
Figure 2:
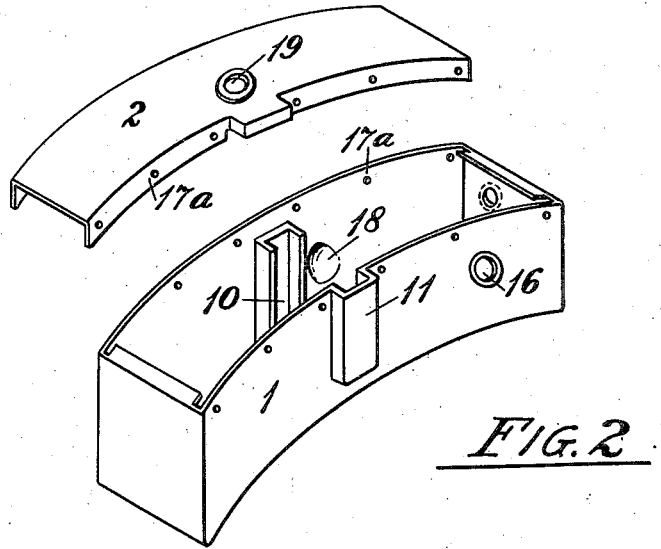
Figure 3:
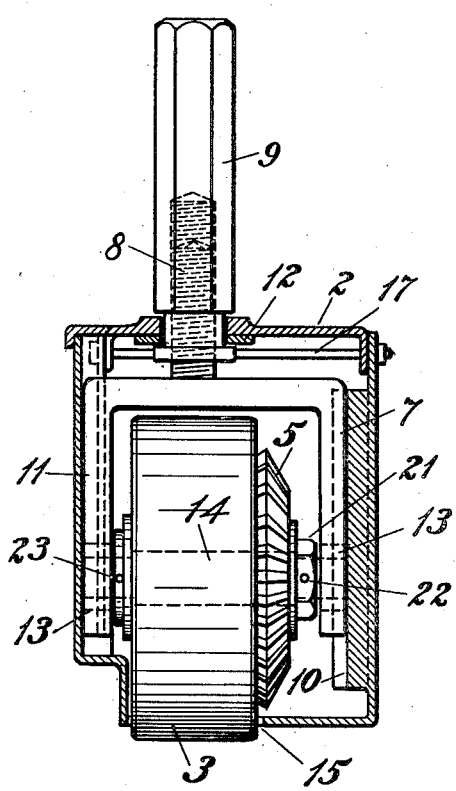
Figure 5:
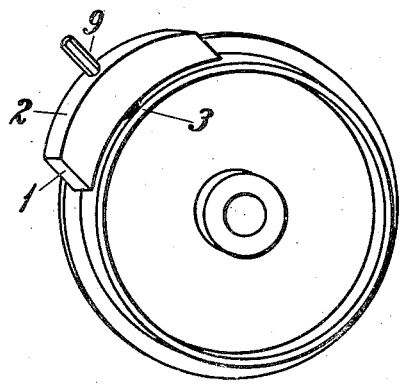
Figure 6:
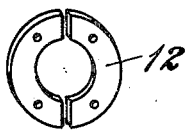
Figure 7:
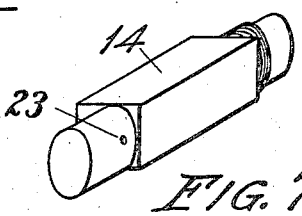
Figure 4:
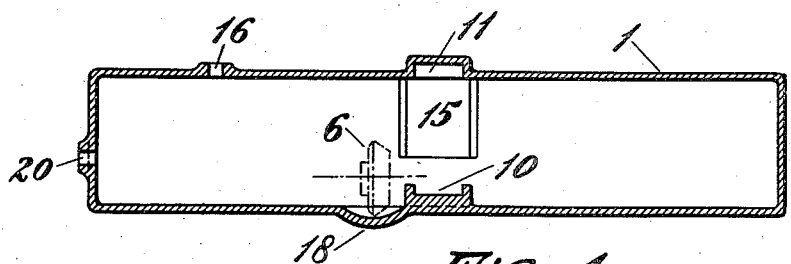

Figure 1 is a vertical longitudinal section through this machine, Fig. 2 is a perspective detail of the casing with its cover slightly removed, Fig. 3 is an enlarged central transverse vertical section through the machine, Fig. 4 is a horizontal section through the casing, Fig. 5 is a perspective detail showing the machine applied to the upper side of a car wheel, Fig. 6 is a perspective detail of the collar hereinafter referred to, and Fig. 7 is an enlarged perspective detail of the axle of the emery wheel.

Similar figures refer to similar parts throughout the several views.

No. 1 is the casing of the machine which is a box curved to correspond to the curve of the tread of the car wheel, No. 2 the top of the box, No. 3 the emery or carborundum wheel, No. 4 the motor located within one end of the box and which can be either air or electric, No. 5 the beveled cog wheel attached to the emery or carborundum wheel, No. 6 the beveled cog wheel of the motor that furnishes the power, and fits into cog wheel 5, No. 7 is the frame or arch that holds the emery or carborundum wheel in place, No. 8 the screw attached to this frame or arch, and which protrudes through the opening in the top, and onto which the handle 9 screws, making it possible to raise and lower frame No. 7, which slides up and down in the grooves Nos. 10 and 11, the handle No. 9 being swiveled through and held in position by collar No. 12, which is set in the opening in the top of box No. 2.

Nos. 13 are the bearings for the trunnions of the core or axle 14.

No. 15 is the opening in the center of the curved bottom of box No. 1, through which the emery or carborundum wheel protrudes to come into contact with the car wheel.

No. 16 is the hole in the side of box No. 1 through which the air motor exhausts, No. 17 is the bolt that holds top No. 2 onto the box, No. 1, No. 17ª are small protrusions that assist in holding the top No. 2 onto box No. 1.

No. 18 is a bulge in the side of box No. 1 to accommodate the beveled cog wheel No. 6 of the motor No. 4.

No. 19 is the hole through the top of box No. 2 into which collar No. 12 fits to hold handle No. 9.

No. 20 is the inlet for the air or electric connection for running the motor, No. 21 is the nut that holds the beveled cog wheel No. 5 in place, Nos. 22 and 23 are the lock pins that go through the core or axle of the emery or carborundum wheel, No. 14.

Box No. 1 is approximately eighteen inches long, curved to correspond with the tread of a car wheel, made of either sheet steel or cast steel, eight inches high and four inches wide. In the center of this box No. 1, and squarely over the aperture No. 15 in the bottom, is an emery or carborundum wheel No. 3 six inches in diameter, whose axle-trunnions 13 and 14 are journaled in the frame or arch 7 which slides up and down in grooves Nos. 10 and 11, the wheel bearings, frame or arch being attached to the top of machine by tension screw No. 8, so the wheel can be raised or lowered by turning handle No. 9, and in that way regulate the emery or carborundum wheel No. 3 so it will come in contact properly with the car wheel while the machine is passed back and forth over the flat spot on the tread of said car wheel, thereby smoothing out or removing the flat spot so the wheel is restored to its natural life, and can be retained in the car, and the work done in less time than it takes to uncouple and set the car on a repair track, which not only saves the delay to the car, but the price of a new pair of wheels and the labor and inconvenience of putting them in the car.

I do not claim the motor as my invention.

I claim:

1. In a wheel grinder, the combination with a casing having its lower wall curved and provided with an opening at its midlength, its side walls being provided with guides alined with said opening, a cover having an opening alined with said guides; of an arch whose arms have a slidable connection with said guides and provided with bearings, means for adjusting the position of the arch along the guides, a grinding wheel disposed within the arch and mounted in said bearings and projecting through the opening in the lower wall of the casing, a gear mounted fast with said grinding wheel, a motor mounted within the casing, and a gear fast on its power shaft and engaging that on the grinding wheel, for the purpose set forth.

2. In a wheel grinder, the combination with a casing having its lower wall curved and provided with an opening, its side walls being provided with guides alined with said opening; of an arch whose arms have a slidable connection with said guides and provided with bearings, means for adjusting the position of the arch along the guides, a grinding wheel disposed within the arch and mounted in said bearings and projecting through the opening in the lower wall of the casing, a gear fast with said grinding wheel, a motor within the casing, and a power gear on the motor engaging that on the grinding wheel, for the purpose set forth.

3. In a wheel grinder, the combination with a casing having its lower wall curved and provided with an opening at its midlength, its side walls being provided with grooves alined with said opening, a removable cover having an opening at its midlength, and a tubular handle swiveled in the last-named opening and having a threaded bore; of an arch whose arms are slidably mounted in said grooves and provided with bearings, a screw rising rigidly from the top of the arch and engaged with the threaded bore of said handle, a grinding wheel disposed within the arch and projecting through the opening in the lower wall of the casing, its axle having trunnions mounted in said bearings, a motor mounted within said casing, and connections between the motor-shaft and the axle of the grinding wheel.

4. In a wheel grinder, the combination with a casing having its lower wall curved and provided with an opening at its midlength, its side walls being provided with grooves alined with said opening, a removable cover having an opening at its midlength, and a tubular handle swiveled in the last-named opening and having a threaded bore; of an arch whose arms are slidably mounted in said grooves and provided with bearings, a screw rising rigidly from the top of the arch and engaged with the threaded bore of said handle, a grinding wheel disposed within the arch and projecting through the opening in the lower wall of the casing, its axle having trunnions mounted in said bearings, a beveled gear fast on one trunnion, a motor mounted within the casing, and a beveled gear fast on its power shaft and engaging that on the grinding wheel, for the purpose set forth.

5. In a wheel grinder, the combination with a casing having its lower wall curved and provided with an opening, its side walls being provided with guides alined with said opening, a cover having an opening, and a tubular handle swiveled in the last-named opening and having a threaded bore; of an arch whose arms are slidably mounted in said guides and provided with bearings, a screw rising rigidly from the arch and engaged with the threaded bore of said handle, a grinding wheel disposed within the arch and projecting through the opening in the lower wall of said casing, its axle having trunnions journaled in said bearings and one of them threaded adjacent the wheel, a beveled gear mounted on this trunnion, a nut screwed on its threaded portion outside the gear, a motor mounted within the casing, and a beveled gear fast on its power shaft and engaging that on the grinding wheel, for the purpose set forth.

CHARLES C. BOGUE.

Witnesses:
MARTIN L. TURCO,
ARTHUR L. HEDLUND.